United States Patent [19]

Von Tomkewitsch

[11] 4,403,291

[45] Sep. 6, 1983

[54] SELF-SUFFICIENT NAVIGATION DEVICE FOR STREET VEHICLES

[75] Inventor: Romuald Von Tomkewitsch, Ebenhausen, Fed. Rep. of Germany

[73] Assignee: Siemens Aktiengesellschaft, Berlin & Munich, Fed. Rep. of Germany

[21] Appl. No.: 194,913

[22] Filed: Oct. 7, 1980

[30] Foreign Application Priority Data

Oct. 11, 1979 [DE] Fed. Rep. of Germany ....... 2941331

[51] Int. Cl.$^3$ ............................................. G06F 15/50
[52] U.S. Cl. ................................... 364/424; 364/444; 364/450; 340/24
[58] Field of Search ............... 364/443, 444, 448, 449, 364/450, 424, 436, 559, 561; 340/24, 27 NA, 52 R; 73/178 R

[56] References Cited

U.S. PATENT DOCUMENTS

| | | | |
|---|---|---|---|
| 3,789,198 | 1/1974 | Henson et al. | 364/450 |
| 3,845,289 | 10/1974 | French | 364/444 |
| 3,925,641 | 12/1975 | Kashio | 364/424 |
| 3,984,806 | 10/1976 | Tyler | 364/450 |
| 4,309,758 | 1/1982 | Halsall et al. | 364/449 |

OTHER PUBLICATIONS

"An Electronic Route-Guidance System for Highway Vehicles" by Rosen et al., Published in IEEE Transactions on Vehicular Technology, vol. VT-19, No. 1, Feb. 1970, pp. 143-152.

"Automatic Route Control System" by French & Lang, Published in IEEE Transactions on Vehicular Technology, vol. VT-22, No. 2, May 1973, pp. 36-41.

*Primary Examiner*—Gary Chin
*Attorney, Agent, or Firm*—Hill, Van Santen, Steadman & Simpson

[57] ABSTRACT

A navigation device serves for the self-sufficient destination guidance for street vehicles. At the beginning of a trip, the destination vector is input by way of an input device in the form of destination coordinates (x,y). During the trip, the path traversed is continuously determined in terms of magnitude and direction, with a dead reckoning navigation device. A destination vector is continuously determined from these measured path vectors and the input relative destination coordinates and is displayed in the field of vision of the driver with a display device.

9 Claims, 3 Drawing Figures

SELF-SUFFICIENT NAVIGATION DEVICE FOR STREET VEHICLES

BACKGROUND OF THE INVENTION

1. Field of the Invention

The present invention relates to a self-sufficient navigation device for street vehicles, whereby the travel path traversed can be determined in terms of magnitude and direction via a path measuring device as well as an angle measuring device.

2. Description of the Prior Art

The principle of dead reckoning navigation has been known per se for quite some time, whereby, the same was primarily considered for locating systems for police vehicles and the like. In these instances, the path vector determined by dead reckoning navigation in the vehicle is reported to a central exchange, which, in turn, calculates the vehicle position therefrom and can make appropriate dispositions therewith.

Guidance system for street vehicles in individual traffic have already been proposed numerous times and, in individual cases, have already been carried out at experimental routes. Nonetheless, the employment of the same over a wide expanse has previously run into problems because such systems presume a relatively involved infrastructure. In these systems, central and decentralized fixed devices for determining and transmitting guidance recommendations to the individual vehicles are required.

Independently of such involved destination guidance systems, however, there is often only a desire for a simple orientation aid which is independent of the traffic situation. In particular, in larger cities, an automobile driver unfamiliar with the locality easily loses his orientation, even if he has undertaken a specific route at the beginning of his trip on the basis of a city map. Inasmuch as such a map provides no information concerning traffic obstacles, construction sites, turning prohibitions, usually not even concerning one-way streets, so that the driver must often deviate from his intended route and then no longer knows whether he is approaching his destination or traveling away therefrom, he is forced to stop, to inform himself concerning his new location and to select a new route on the basis of the map.

In order to provide a better possibility for orientation in such cases, it has already been proposed to control a graticule over a map or, respectively, a city plan with the assistance of a dead reckoning system in such a manner that one's own location is always identified. This not only requires maps to scale which are specifically suitable for the vehicle device, but, rather, also requires a device which can be readjusted to different scales, since maps having different scales must be selected at least between orientation in a metropolitan area and orientation in cross-country journeys. The decisive disadvantage of this known device, however, is that the automobile driver receives a display of only his location, but not of his destination so that he is forced again and again to stop, to seek his destination on the map and to select his direction of travel from the location displayed.

SUMMARY OF THE INVENTION

The object of the present invention is to provide a self-sufficient navigation device having dead reckoning navigation of the type initially mentioned in such a manner that an orientation aid from the point of beginning to the destination is available to the driver of a street vehicle which is always available during the trip without further operations, and which is easy to perceive and follow even during driving.

The above object is achieved, according to the present invention, given a device of the type generally mentioned above, in that an input device is provided by way of which a special travel destination can be respectively input with its relative designation coordinates with respect to the point of beginning of the trip of the vehicle and can be evaluated for the formation of a destination vector, and in that the respectively valid designation vector can be displayed in terms of magnitude and direction by way of a post-connected output display device.

The navigation device constructed in accordance with the present invention, therefore, requires no special maps in a scale justified to the system, since the relative designation coordinates are input by the user at the beginning of the trip. This can be carried out in a simple manner in that the user determines the vectorial destination between the starting point and the destination from any desired city plan or from a map in accordance with the scale selected and keys in this data in the form of coordinates. This is most simple to carry out with Cartesian coordinates, whereby the user need simply measure or estimate the distance in the east-west direction and the north-south direction on his map and input such information by way of his input device. The input may also be carried out with polar coordinates, but an angle is usually more complicated to determine than a path.

Therefore, in using the device constructed in accordance with the present invention, an orientation on the basis of a map, or a city plan, is first required; nonetheless, this is necessary only once in every case, namely before the beginning of the trip. When the destination coordinates have been once input into the device, then the driver need only read the direction and distance from his display device and drive accordingly. Even if he is forced by detours or other conditions to deviate from his destination direction and travel circuitous routes, he will always find his way back to his destination since his device always displays whether he is proceeding in the direction toward the destination or whether he must change directions at the next opportunity. At the same time, he receives the linear distance from the destination by way of his display device.

The determination of the path vector can ensue in a known manner with a magnetic field probe and a path counter. For example, an already existing on-board computer can be co-employed for calculating and storing the destination vector. In a preferred embodiment, the display device comprises a compass-type instrument which has a needle, or respectively, an arrow, which displays the direction of the destination vector. The magnitude of the destination vector is advantageously output digitally in a manner known per se. Although it would also be possible to express the distance by the length of the directional arrow, such a display would be difficult to read, particularly given short distances; at the very least, a change of scale would have to be provided between the display in a metropolitan area and the display in cross-country journeys. Given a digital display of the distance, it suffices to provide sufficient decimal locations of the counter in order to obtain a precise display in any case of use.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
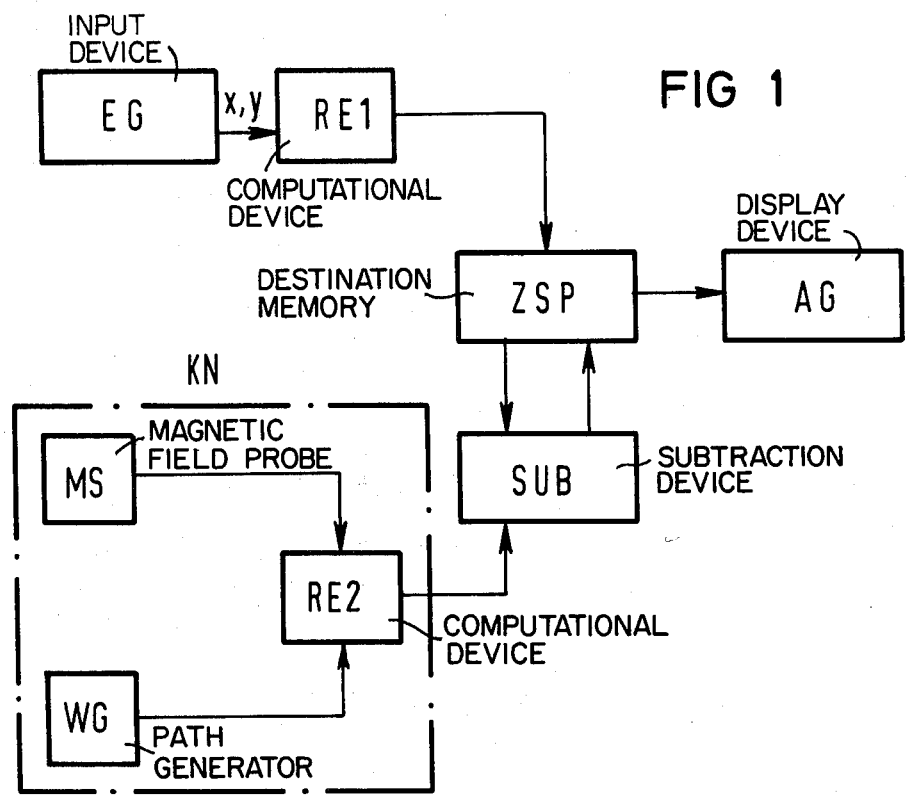
FIG. 1 is a block diagram illustration of a self-sufficient navigation device for a vehicle, such device constructed in accordance with the present invention.

Referring to FIG. 1, a block diagram illustration shows the simple manner of operation of the navigation device of the present invention. The relative destination coordinates x, y are input by way of an input device EG. These destination coordinates correspond to the distance of the selected travel destination from the starting point in the east-west direction and in the norht-south direction. The coordinates are determined by the user on the basis of a city plan, of a map or of some other desired document. The destination vector is determined by way of a computational device RE1 from the relative destination coordinates x, and y which have been input, and the destination vector is input into a destination memory ZSP. The content of the destination memory ZSP is displayed with a display device AG in terms of magnitude and direction.

As soon as the vehicle is in motion, the designation vector, i.e. the content of the destination memory ZSP, is continuously changed in accordance with the path traversed by the vehicle. To this end, the path vector is continuously measured in terms of magnitude and direction in a dead reckoning navigation device KN. For example, a magnetic field probe MS is provided for the angular measurement and a path generator WG is provided for the path measurement. The respective path vector, i.e. the magnitude and direction of the path traversed are measured from these values by way of a computational device RE2 and are vectorially subtracted from the last valid destination vector in a subtraction device SUB. For this purpose, the destination vector last stored is input into the subtraction device SUB from the destination memory ZSP. The new destination vector arising from the subtraction is then, in turn, written in the destination memory ZSP.

Figure 2:
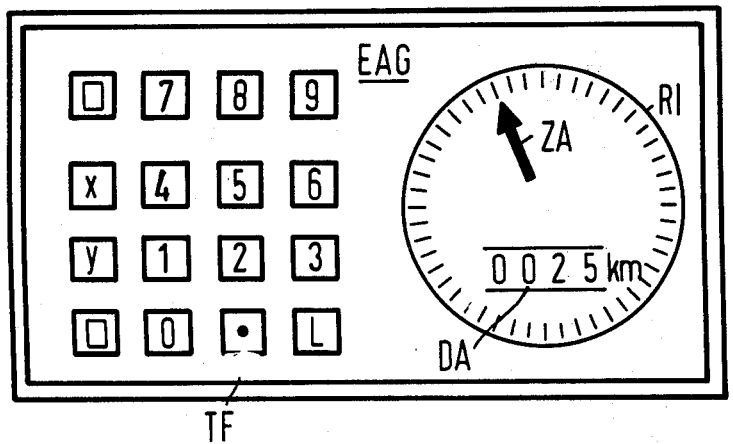
FIG. 2 is a plan view of an input and display device for use in the vehicle.

FIG. 2 illustrates an exemplary embodiment of a combined input and display device EAG as can be incorporated in a motor vehicle on the dashboard. The input portion comprises a keyboard which at least contains keys for x and y, keys for the numerals 0-9, and a decimal point key, but which, under certain conditions, can also contain an erase key or keys for further functions. A display AP on the right-hand side essentially comprises a compass-like instrument RI having an angular division scale as well as an indicator display DA which can be formed, for example, by luminescent diodes, liquid crystals or other known display devices. Moreover, the display contains a digital display for the magnitude of the destination vector. In the example of FIG. 2, the digital display DA is integrated into the compass-like instrument RI. Of course, this distance display can also be arranged at a different location.

Figure 3:
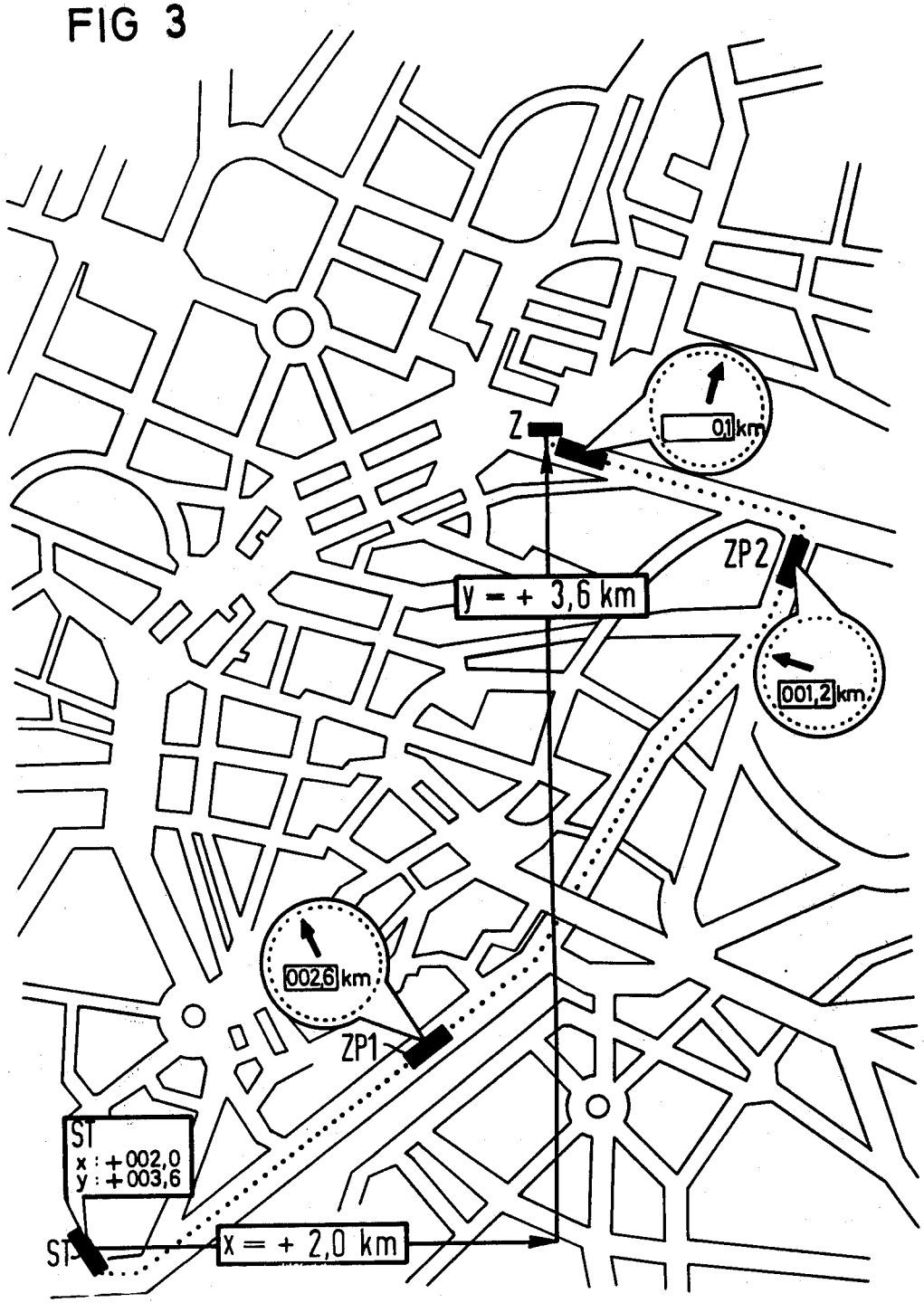
FIG. 3 is a map or city plan view illustrating the utilization of the navigation device of the present invention in a metropolitan area.

Referring to FIG. 3, the manner of operation of the self-sufficient navigation system on the basis of a schematic city plan is illustrated. It is assumed in this example that an automobile driver wishes to be guided from a starting point ST to a destination point Z. He takes the relative coordinates x and y of the destination point Z from a city play and keys the same into his input device. In the present example, therefore, x = +002.0 km and y = 003.6 km. During the trip, the display device continuously displays the direction and distance (linear distance) to his destination. In FIG. 3, the displays respectively valid for three arbitrarily selected intermediate points ZP1, ZP2 and ZP3 are illustrated. At the point ZP1, the display arrow deviates only slightly from the central axis of the vehicle. For the driver, this means that he should remain on the main arterial on which he is presently driving. At the intermediate point ZP2, the directional arrow points approximately 80° toward the left. The driver selects the next street that branches off in this direction.

At the intermediate point ZB3, the driver sees that he is already located 100 m in front of his designation. He can now, without effort, home in on the precise destination Z in front of him. The overall path traveled is marked in FIG. 3 with a dotted line. As can be seen from FIG. 3, the continuous display of the linear distance leads the automobile driver to the desired point, although, because of local conditions, he cannot drive in the direction of the destination in a direct manner.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A self-sufficient navigation apparatus for a vehicle, comprising:

a dead reckoning means including distance measuring means for measuring and providing distance data of the path traveled by the vehicle, angle measuring means for measuring and providing angular data of the path traveled by the vehicle, and first computational means connected to said distance measuring means and said angle measuring means and operable to provide travel vector data in response to the distance data and angular data;

input means for providing destination data on a coordinate basis;

second computational means connected to said input means and operable to convert said destination data into destination vector data;

destination memory means connected to said second computational means for storing destination vector data;

substraction means connected to said destination memory means and to said first computational means and operable to subtract said travel vector data from said destination vector data and store the resulting data in said destination memory means; and display means connected to said destination memory means for displaying said resulting data, including distance display means and direction display means.

2. The apparatus of claim 1, wherein:
said distance display means comprises a digital display; and
said direction display means comprises a compass-type display.

3. The apparatus of claim 2, wherein:
said digital display is included within said compass-type display.

4. The apparatus of claim 1, wherein:
said input means and said display means are combined into an integrated unit adapted for mounting in the dashboard of the vehicle.

5. The apparatus of claim 4, wherein:
said input means comprises a keyboard.

6. A self-sufficient navigation apparatus for a vehicle, comprising:
a dead reckoning means including distance measuring means for measuring and providing distance data of the path traveled by the vehicle, angle measuring means for measuring and providing angular data of the path traveled by the vehicle, and first computational means connected to said distance measuring means and said angle measuring means and operable to provide travel vector data in response to the distance data and angular data;
input means for providing destination data on a coordinate basis, including keyboard means manually operable for generating the designation data;
second computational means connected to said input means and operable to convert said destination data into destination vector data;
destination memory means connected to said second computational means for storing destination vector data;
substraction means connected to said destination memory means and to said first computational means and operable to subtract said travel vector data from said destination vector data and store the resulting data in said destination memory means; and
display means connected to said destination memory means for displaying the resulting data, including distance display means and direction display means, said distance display means comprising a digital display and said direction display means comprising a compass-type display.

7. The apparatus of claim 6, wherein said digital display is included within said compass-type display.

8. The apparatus of claim 7, wherein:
said input means and said display means are combined into an integrated unit adapted for mounting in the dashboard of the vehicle.

9. A self-sufficient navigation apparatus for a vehicle, comprising:
a dead reckoning means including distance measuring means for measuring and providing distance data of the path traveled by the vehicle, angle measuring means for measuring and providing angular data of the path traveled by the vehicle, and computational means connected to said distance measuring means and said angle measuring means and operable to provide travel vector data in response to the distance data and angular data;
input means for providing destination data as a vector on a polar coordinate basis;
destination memory means connected to said input means for storing destination vector data;
substraction means connected to said destination memory means and to said computational means and operable to subtract said travel vector data from said destination vector data and store the resulting data in said destination memory means; and
display means connected to said destination memory means for displaying said resulting data, including distance display means and direction display means.

* * * * *